Jan. 4, 1927. Re. 16,518

R. A. GORSUCH

SHIPPING BOX FOR CHICKS

Original Filed August 22, 1925

Inventor

Robert A. Gorsuch

By Hull, Brock & West

Attorneys.

Reissued Jan. 4, 1927. Re. 16,518

UNITED STATES PATENT OFFICE.

ROBERT A. GORSUCH, OF GAMBIER, OHIO.

SHIPPING BOX FOR CHICKS.

Original No. 1,594,170, dated July 27, 1926, Serial No. 51,743, filed August 22, 1925. Application for reissue filed November 26, 1926. Serial No. 150,995.

The shipping of incubator-hatched chicks has grown to large proportions in this country and the problem of a suitable shipping box sufficiently strong and yet cheap, sanitary and amply ventilated has engaged the attention of inventors for some time. Such boxes are now made in large numbers chiefly of corrugated paper board.

The object of the present invention is to provide an improved form of shipping box for the purpose indicated in which the chicks can be safely shipped and which can be utilized as a brooder for the chicks after receipt by the purchaser.

The invention is embodied in the example herein shown and described the features of novelty being finally claimed.

Figure 1:
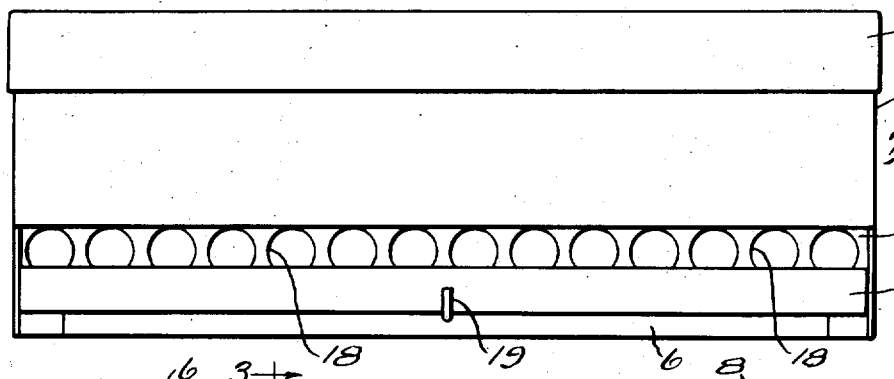
Figure 2:
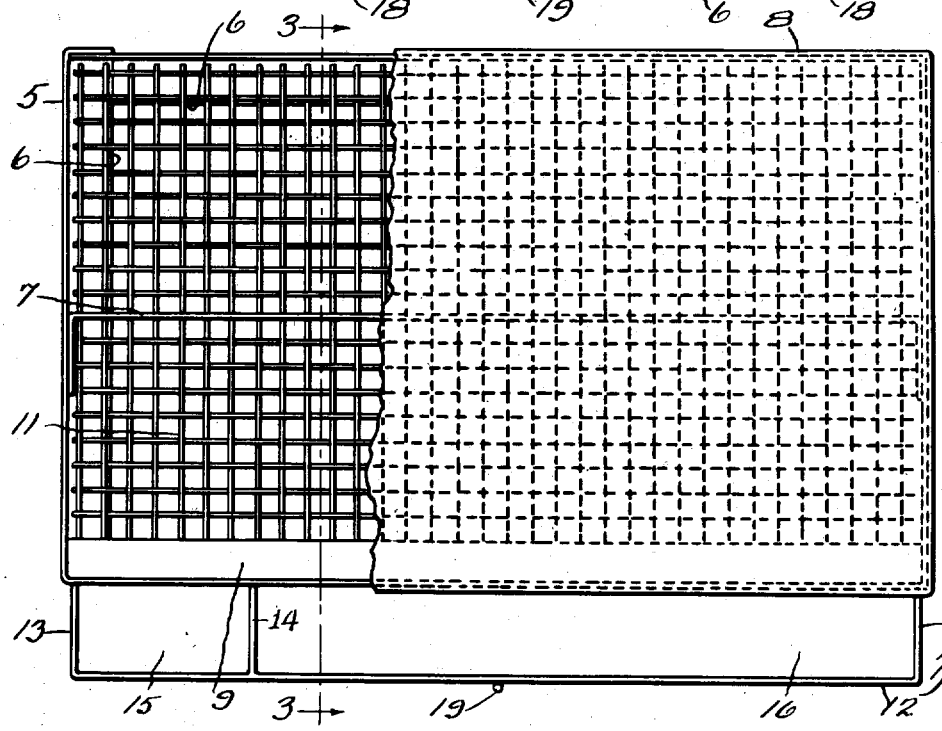
Figure 3:
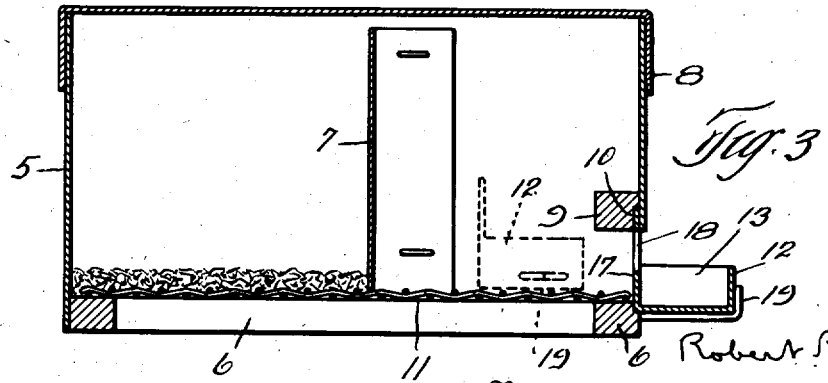

In the drawing hereto attached Fig. 1 is a front elevation of the invention; Fig. 2 is a top plan view with a portion of the cover removed; Fig. 3 is a cross section on the line 3—3.

In the views 5 designates the body of the box, the four vertical walls of which are formed of a strip of corrugated paper board bent to form the four walls leaving a narrow margin at one end to be fastened with wire staples. In the bottom of the box is secured a wooden frame 6 covered with a floor of woven wire screen 11 of half-inch mesh, said woven wire fabric being suitably secured on the upper surface of said frame 6.

Secured longitudinally in the box is a partition 7 of corrugated paper board dividing the box into two chambers, the strip forming the partition being provided with bent ends that are stapled to the end walls of the box. The partition 7 is made of sufficient depth to extend to the wire screen floor but not quite to the top of the box so as to leave a small narrow space between it and the cover. The cover which is designated 8 is formed of a single sheet of corrugated card board suitably cut at the corners to permit the bending down of four flanges and provide tabs for stapling the flanges together and fixing them in their proper position.

The front longitudinal wall of the box is cut away longitudinally at its lower portion substantially its entire length to form a narrow opening and the interior of said wall along said opening is provided with a wooden strip 9 rabbeted as shown at 10, at its lower outer side to form with the wall a narrow groove. The wooden strip 9 reinforces the edge of the wall along the opening.

12 designates a trough of sheet metal, preferably galvanized sheet iron, having closed ends 13, 13 and a partition 14 dividing the trough into a small receptacle 15 for water and a large receptacle 16 for chick feed. One wall of the trough is extended upward as shown at 17, this extension being provided with a series of circular holes 18 through which the birds can extend their heads to take feed and water. In use the upwardly extended wall of the trough is inserted in the groove referred to, the front rail of the frame 6 being rabbeted to receive the lower rear corner of the trough. When the trough is inserted in the position shown and described it can be secured by one or more angle screws 19 turned into the wooden rail of the frame 6 as indicated.

In practice the chicks are usually shipped the day they are hatched they being placed in the rear compartment and upon a suitable layer of excelsior on the wire screen floor. Chicks do not thus early feed much, if at all, and the law allows shipment to destination not over seventy two hours distant by rail from the point of shipment.

The trough 12 and screw or screws for holding it are shipped along with the chicks these being placed in the front compartment as suggested by broken lines Fig. 3.

The holes 18 in the extended wall of the trough are made of such size that a chick a day old cannot get its body through and a chick three weeks old can get its head through.

It will be observed that the screen and the small space at the top of the partition permit adequate indirect ventilation during transportation. If more ventilation is needed when used as a brooder holes can be punched in the cover.

The purchaser of chicks upon receipt of the box installs the trough, removes the partition 7 and supplies the trough with feed and water, the chicks afterwards feeding and drinking by poking their heads through the circular holes 18.

Upon arrivel of the box the purchaser should also remove the excelsior so that all droppings thereafter can pass through the wire screen floor onto a sheet of paper, a pan or other suitable receptacle placed thereunder for the purpose. I have found that where the screen floor is of about half-inch mesh no trouble is experienced on account of the legs of the chicks being caught in the mesh as the chicks naturally find the wires of the screen to grasp with their feet.

The forms of the parts can be changed without departing from the gist of the invention as claimed.

Having thus described my invention, what I claim is:—

1. A combined shipping device and brooder for chicks consisting of a box provided with a wire screen bottom, a temporary removable partition dividing the box into a confining transporting compartment and a compartment adapted, when said partition is removed, to form with the transporting compartment a brooder, said last named compartment provided with a longitudinal opening in one of its walls, a movable feeding and drinking trough having an upwardly extending wall provided with a series of openings adapted to be placed over said longitudinal opening and cooperate therewith to permit the chicks to extend their heads only therethrough, and means for securing said trough in said position.

2. A shipping box for chicks provided with a wire screen bottom, a temporary partition dividing the box into compartments, one of said compartments having a wall provided with a longitudinal opening and a reinforcing strip for said opening forming a groove, and a feeding and drinking trough having an upwardly extended wall provided with a series of openings through which the chicks can extend their heads, said wall adapted to engage said groove and means for securing said trough when so engaged.

3. As a new article of manufacture, a shipping box for baby chicks that is convertible into a brooder, the same comprising a box body of paper board, a cover therefor, and a trough movable from a position inside, to a definite position outside, the box, one wall of the box having an opening through which access to the trough may be had from the interior of the box when the trough is in the latter position.

4. As a new article of manufacture, a shipping box for baby chicks that is convertible into a brooder, the same comprising a box body of paper board having a foraminous bottom, a cover for the box, a removable layer of suitable material covering the foraminous bottom, and a trough movable from a position inside, to a definite position outside, the box, one wall of the box having an opening through which access to the trough may be had from the interior of the box when the trough is in the latter position.

5. As a new article of manufacture, a shipping box for baby chicks that is convertible into a brooder, the same comprising a box body of paper board, a cover of similar material for said box body, the box body having a foraminous bottom, a removable partition temporarily dividing the box into two compartments, a removable layer of suitable material covering the foraminous bottom in one of said compartments, a trough of a size to be accommodated in the other compartment, and means for attaching the trough to the exterior of one wall of the box, said wall having an opening through which access to the trough may be had from the interior of the box.

6. As a new article of manufacture, a shipping box for baby chicks that is convertible into a brooder, the same comprising a paper board box body having a removable cover and a foraminous bottom, a removable partition for temporarily dividing the box into compartments during shipment, a removable covering for the foraminous bottom in certain of the compartments, and a trough of a size to be accommodated in one of said compartments and that is adapted to be applied to the exterior of one wall of the box, said wall having an opening affording access to the trough from the interior of the box.

7. As a new article of manufacture, a shipping box for baby chicks that is convertible into a brooder, the same comprising a rectangular frame of paper board, a wire screen bottom inset within the lower end of the frame, a paper board cover for application to the upper end of the frame, a removable layer of suitable material covering the foraminous bottom, and a trough movable from a position inside, to a definite position outside, the box, one wall of the box having an opening through which access to the trough may be had from the interior of the box when the trough is in the latter position.

In testimony whereof I hereunto affix my signature.

ROBERT A. GORSUCH.